United States Patent
Senger et al.

(10) Patent No.: US 11,279,564 B1
(45) Date of Patent: Mar. 22, 2022

(54) CONVEYOR HAVING AT LEAST ONE FLEXIBLE BELT AND METHOD OF TENSIONING THE AT LEAST ONE BELT

(71) Applicant: A. G. Stacker Inc., Weyers Cave, VA (US)

(72) Inventors: Randall Donn Senger, Mount Sidney, VA (US); Eric Stempihar, Rockingham, VA (US); Joseph Wunder, Lexington, VA (US); Brian Scott Powers, Port Republic, VA (US)

(73) Assignee: A. G. STACKER INC., Weyers Cave, VA (US)

( * ) Notice: Subject to any disclaimer, the term of this patent is extended or adjusted under 35 U.S.C. 154(b) by 0 days.

(21) Appl. No.: 17/211,314

(22) Filed: Mar. 24, 2021

(51) Int. Cl.
*B65G 23/44* (2006.01)
*B65G 15/32* (2006.01)

(52) U.S. Cl.
CPC ............ *B65G 23/44* (2013.01); *B65G 15/32* (2013.01)

(58) Field of Classification Search
CPC ................................ B65G 23/44; B65G 15/32
USPC .................................................. 198/813, 816
See application file for complete search history.

(56) References Cited

U.S. PATENT DOCUMENTS

| | | | | |
|---|---|---|---|---|
| 1,397,656 A | * | 11/1921 | Rasmussen | B65B 23/12 198/535 |
| 2,969,138 A | * | 1/1961 | Sykokis | B65G 23/14 198/816 |
| 3,638,743 A | | 2/1972 | Douglas | |
| 3,765,037 A | | 10/1973 | Dunkin | |
| 3,923,151 A | * | 12/1975 | Weber | B65G 43/00 198/810.04 |
| 3,947,902 A | | 4/1976 | Conde et al. | |
| 4,684,314 A | | 8/1987 | Luth | |
| 5,193,650 A | | 3/1993 | Kent, Jr. | |
| 6,220,420 B1 | | 4/2001 | Jan et al. | |
| 6,578,705 B2 | * | 6/2003 | Lunghi | B65G 15/00 198/810.04 |
| 7,134,544 B1 | * | 11/2006 | Kilper | B65G 23/44 198/813 |
| 7,284,651 B2 | | 10/2007 | Heinemeier et al. | |
| 8,807,323 B2 | | 8/2014 | Allen, Jr. et al. | |

(Continued)

FOREIGN PATENT DOCUMENTS

| | | | | |
|---|---|---|---|---|
| CN | 104828482 | * | 8/2015 | ............ B65G 23/44 |
| KR | 20210096378 A | * | 8/2021 | ............ B65G 23/44 |

(Continued)

*Primary Examiner* — James R Bidwell
(74) *Attorney, Agent, or Firm* — J-Tek Law PLLC; Jeffrey D. Tekanic; Scott T. Wakeman

(57) ABSTRACT

A conveyor includes first and second support shafts and at least one belt supported between the first and second support shafts that has an upper load-carrying portion and a lower return portion. A first gear is connected to the first support shaft, a second gear is connected to the second support shaft and a drive chain or belt is supported by the first and second gears and has an upper run and a lower run. The upper run includes a tension control device for maintaining a tension on the upper run and the lower run includes an arrangement for displacing a portion of the lower run in order to rotate the first gear in a first direction and the second gear in a second direction opposite the first direction to increase a tension of the upper load carrying portion of the at least one belt. Also an associated method.

17 Claims, 7 Drawing Sheets

(56) References Cited

U.S. PATENT DOCUMENTS

| | | | |
|---|---|---|---|
| 9,169,075 B2 | 10/2015 | Allen et al. | |
| 10,589,937 B1 * | 3/2020 | Allen, Jr. | ............... B65G 17/24 |
| 2003/0075657 A1 | 4/2003 | Joubert | |
| 2006/0283687 A1 | 12/2006 | Heinemeier et al. | |

FOREIGN PATENT DOCUMENTS

| | | |
|---|---|---|
| WO | 8606355 A | 11/1986 |
| WO | 9510468 A | 4/1995 |

* cited by examiner

CONVEYOR HAVING AT LEAST ONE FLEXIBLE BELT AND METHOD OF TENSIONING THE AT LEAST ONE BELT

TECHNOLOGICAL FIELD

The present disclosure is directed to a conveyor having at least one flexible belt and a device and method for adjusting a tension of the belt, and, more specifically, toward a conveyor having at least one flexible belt driven by a drive chain or a drive belt and a device and method for adjusting the tension of the flexible belt via the drive chain or drive belt.

BACKGROUND

Conveyors are known that include one or more flexible belts with upper support surfaces for carrying objects. The belt or belts of these conveyors are supported between two support shafts, one at either end of the conveyor. Flexible belts can only be driven by a pulling action; it is not possible to drive a flexible belt by pushing on it. Therefore, flexible belt conveyors are usually driven by applying a driving force to the support shaft at the "forward" end of the conveyor relative to the direction of travel of the support surface. That is, when viewed from one side, if the support surface of the conveyor is to be moved from left to right, the rightmost support shaft will be driven; if the support surface of the conveyor is to be driven from right to left, the leftmost support shaft will be driven. The need to drive each of the two support shafts at different times means that two drives are often required to drive a conveyor with flexible belts in forward and reverse directions.

The present Applicant developed a conveyor with a centrally located drive that can drive a flexible belt forward and in reverse using a single centrally mounted drive. This conveyor is described in U.S. Pat. No. 9,169,075, the contents of which are hereby incorporated by reference.

The conveyor disclosed in U.S. Pat. No. 9,169,075 includes sprocket wheels on the front and rear support shafts that are connected to a centrally mounted drive by a chain. The chain is driven in a first direction to rotate the "front" one of the support shafts to pull the upper support portion of the belt toward the front support shaft and driven in a second, opposite direction to rotate the "rear" one of the support shafts to pull the upper support portion toward the rear support shaft. Thus, in operation, the belt is always moved by pulling it toward a drive one of the support shafts.

It is often necessary to set or adjust the tension of the upper portion of a flexible belt. Many belts can be tensioned by using one or more idler rollers that press against the return portion of the belt and which may direct the return portion of the belt along a serpentine path that can be adjusted to change the length of the return portion of the belt. However, some flexible belts are formed from a plurality of rigid links that are pivotally connected at their ends so that the overall belt is flexible. It is more difficult to control the tension on such belts. The tension may be controlled by selecting a particular length, and therefore weight, of the return portion of the belt, or a roller may be provided to apply a downward pressure on the inner surface of the return portion of the flexible belt. Neither of these measures allows for precise tension control, and both methods require a relatively large amount of space beneath the conveyor, which makes them unsuitable for use with conveyors that must be mounted in close proximity to a support surface. These methods also result in slack on the non-taut portion of the belt, which, when the direction of the belt is reversed, results in poor control of the belt and the product which it conveys can become unstable.

It would therefore be desirable to provide a conveyor with mechanism for tensioning a flexible belt that is compact and avoids the above mentioned difficulties.

SUMMARY

These and other problems are addressed by embodiments of the present invention, a first aspect of which comprises a method of tensioning at least one belt of a conveyor. The conveyor comprises a first support shaft, a second support shaft, a first gear connected to the first support shaft, a second gear connected to the second support shaft, and a drive chain or drive belt supported by the first and second gears, the chain or belt having an upper run and a lower run. The drive chain or drive belt is configured to rotate the first support shaft to drive the at least one belt. The at least one belt is supported between the first and second support shafts and has an upper load-carrying portion and a lower return portion. The method includes displacing a portion of the lower run to rotate the first gear in a first direction and the second gear in a second direction opposite the first direction to increase a tension of the upper load-carrying portion of the at least one belt.

Another aspect of the invention comprises a conveyor having a frame, first and second support shafts supported by the frame and at least one belt supported between the first and second support shafts and having an upper load-carrying portion and a lower return portion. A first gear is connected to the first support shaft, a second gear is connected to the second support shaft, and a drive chain or drive belt is supported by the first and second gears which drive chain or drive belt has an upper run and a lower run. The drive chain or drive belt is configured to rotate the first support shaft to drive the at least one belt. The conveyor includes a mechanism for controlling a tension of the upper run by varying a length of the upper run, and a mechanism for displacing a portion of the lower run to rotate the first gear in a first direction and the second gear in a second direction opposite the first direction to increase a tension of the upper load carrying portion of the at least one belt.

BRIEF DESCRIPTION OF THE DRAWINGS

These and other feature and benefits of the invention will be better understood upon a reading of the following detailed description in connection with the attached drawings, wherein.

DETAILED DESCRIPTION

Figure 1:
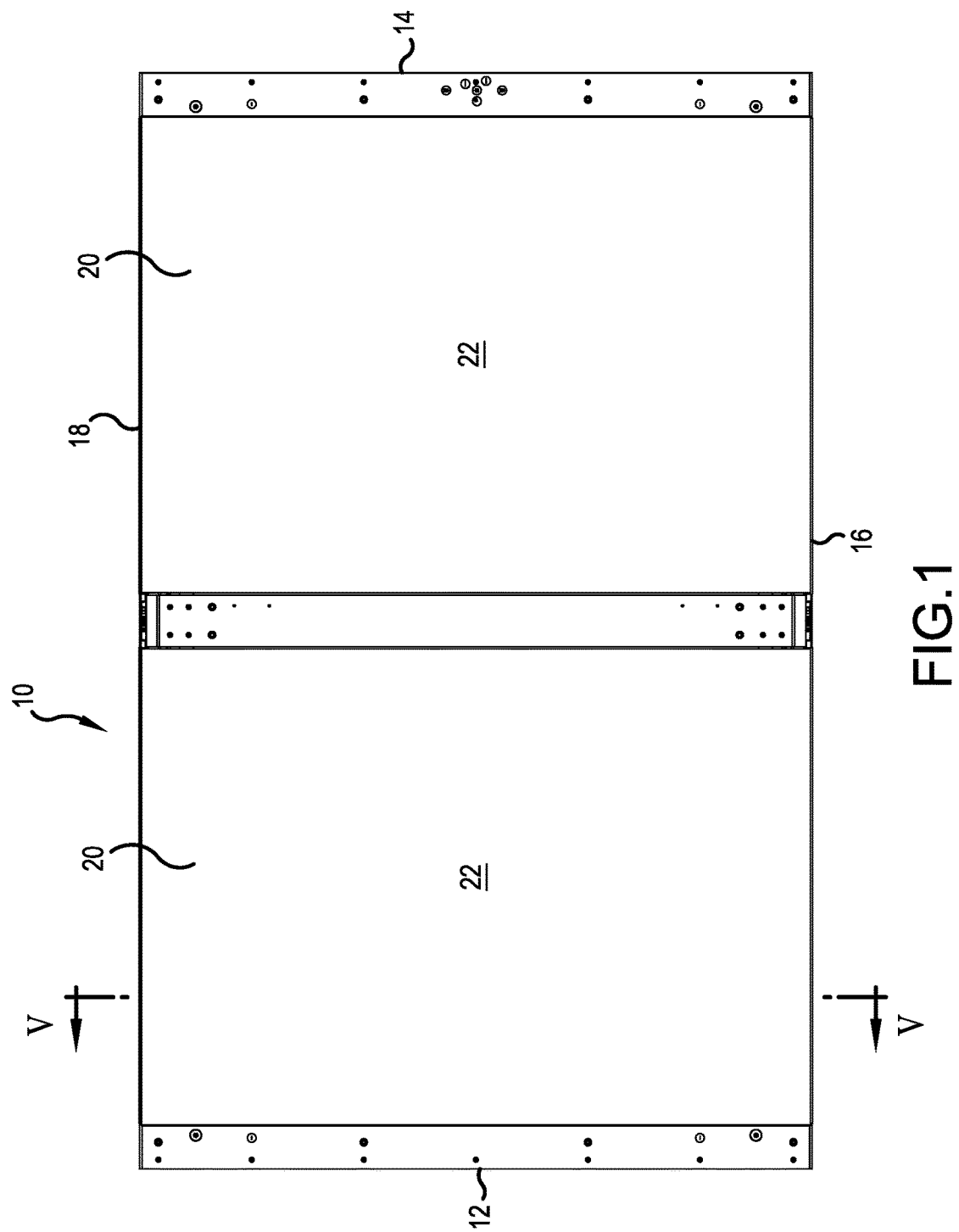
FIG. 1 is top plan view of a conveyor having a flexible belts and a belt tension adjustment mechanism according to an embodiment of the present invention.

Referring now to the drawings, in which the showings are for the purpose of illustrating embodiments of the present invention only and not for the purpose of limiting same, FIG. 1 shows a conveyor 10 having a left side 12, a right side 14, a rear 16 and a front 18. First and second flexible belts 20 extend between the rear 16 and front 18 of the conveyor 10. The number of belts is not limited to two, and either a single wide belt or a plurality of narrower, strip-like belts can be used instead of the two belts 20 shown. The top portions of the belts 20 may be referred to as an upper support surface 22 of the conveyor 20.

Figure 2:
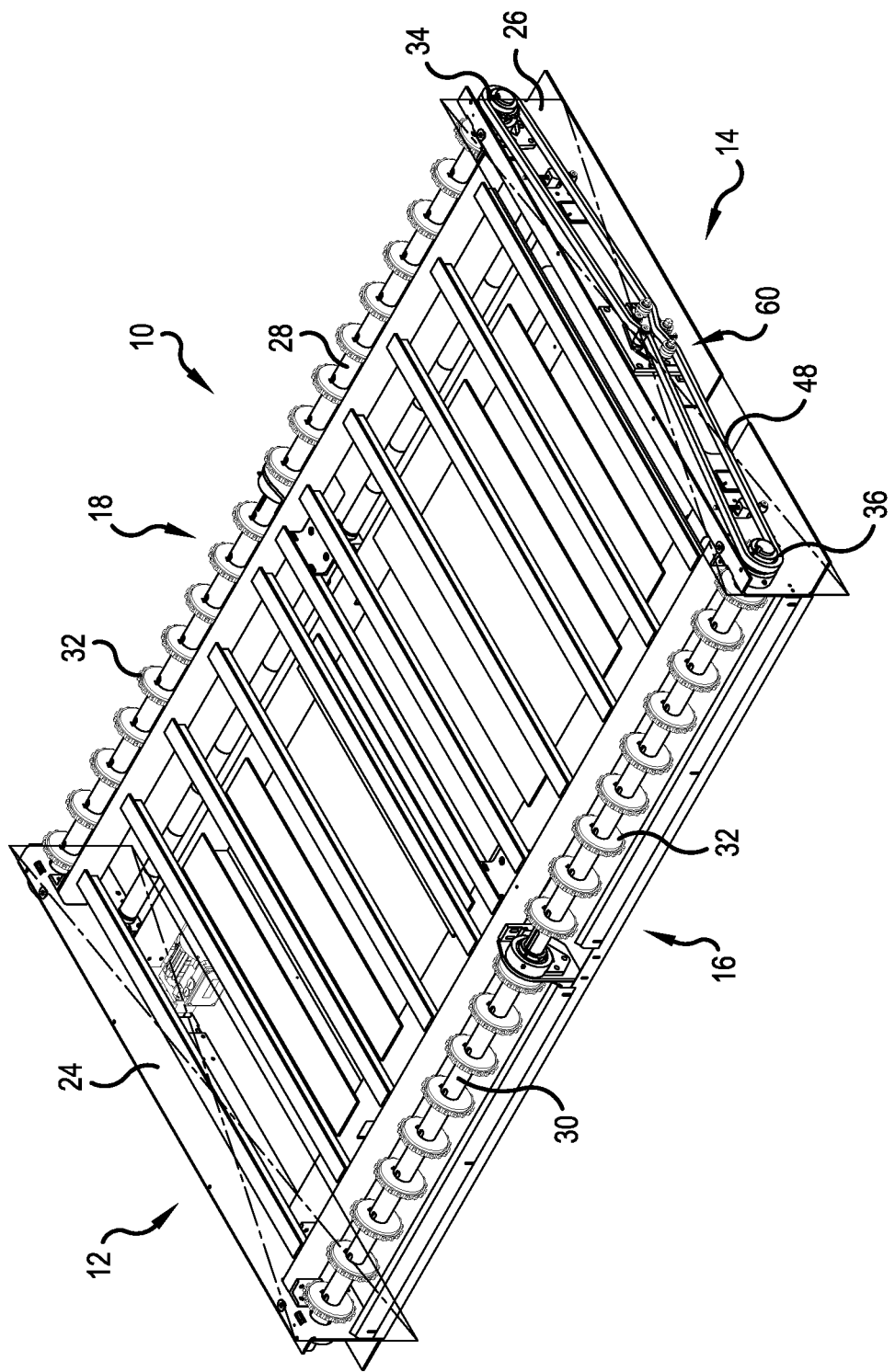
FIG. 2 is a perspective view of the conveyor of FIG. 1 with the belts removed.

FIG. 2 shows the conveyor 10 of FIG. 1 with the belts 20 removed for illustration purposes. The conveyor 10 includes a left frame member 24 and a right frame member 26. A front support shaft 28 and a rear support shaft 30 each extend between the left and right frame members 24, 26. A plurality of sprockets 32 are mounted on each of the front and rear support shafts 28, 30 for rotation therewith, and the sprockets 32 are located between the left and right frame members 24, 26. The sprockets 32 engage openings in the inner sides of the flexible belts 20 in a conventional manner when the flexible belts are mesh belts or belts formed with interlocking, rigid links. The sprockets 32 could be replaced with pulleys or flanged wheels or toothed wheels when the flexible belts comprise individual round or flat belts or toothed belts, in a conventional manner.

A first gear 34 is connected to the right end of the front support shaft 28 on the side of the right frame member 26 opposite from the sprockets 32, a second gear 36 is connected to the right end of the rear support shaft 30 on the side of the right frame member 26 opposite from the sprockets 32, and a third gear 38 (FIG. 3) is connected to the left end of the front support shaft 28 on the side of the left frame member 24 opposite the sprockets 32.

Figure 3:
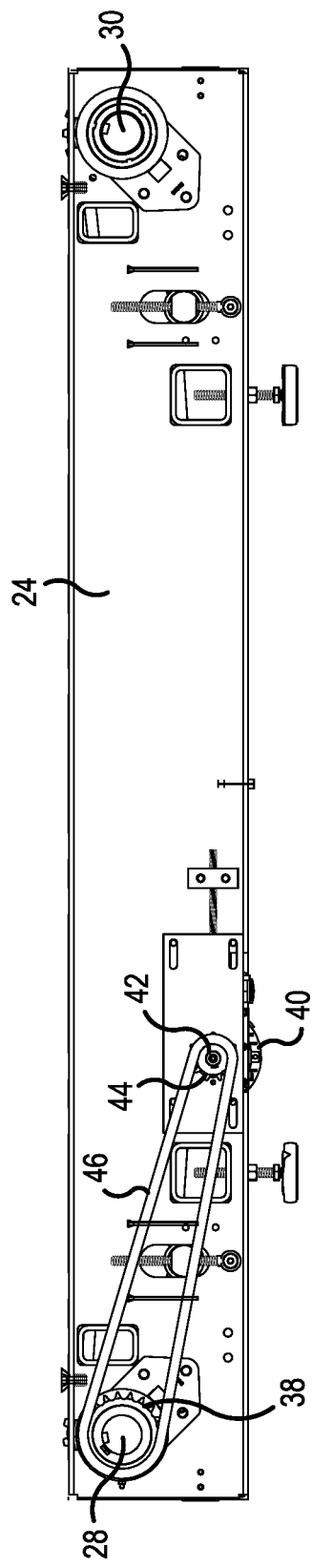
FIG. 3 is a left side elevational view of the conveyor of FIG. 1.
Figure 5:
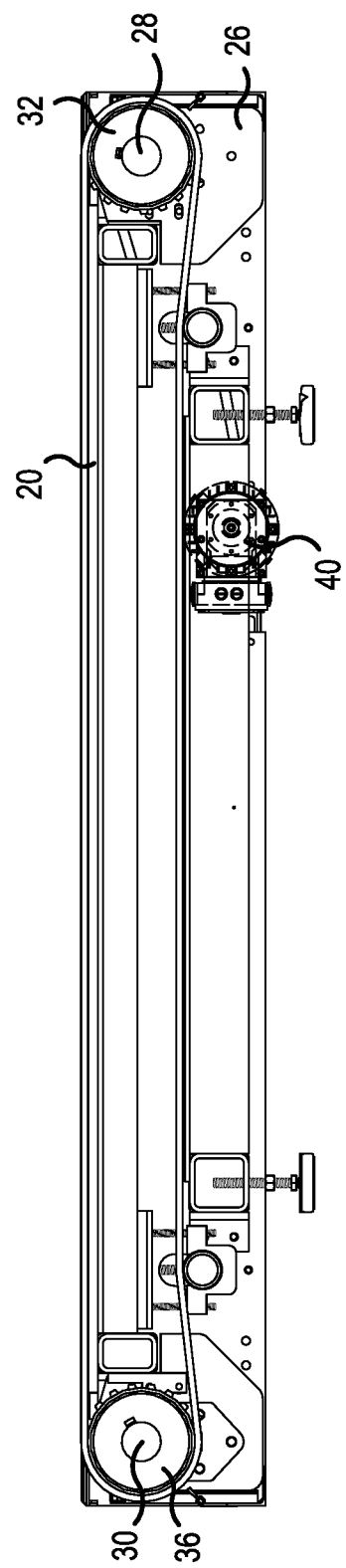
FIG. 5 is a sectional view in the direction of line V-V in FIG. 2.

The left frame member 24 is shown in FIG. 3. A drive 40, which may comprise an electric motor, is partially visible in FIG. 3 and can also be seen in FIGS. 1 and 5. The drive 40 is mounted between the left frame member 24 and the right frame member 26 and includes a drive shaft 42 that projects through the left frame member 24. A drive gear 44 is mounted on the drive shaft 42, and a first drive chain 46 connects the drive gear 44 to the third gear 38 on the left end of the front support shaft 28. While it is generally preferred to use a chain connected to the sprockets at ends of the support shafts, other positive engagement, non-slip connections, such as those between a toothed drive belt and toothed wheels connected to the front and rear support shafts 28, 30 could also be used.

Figure 4:
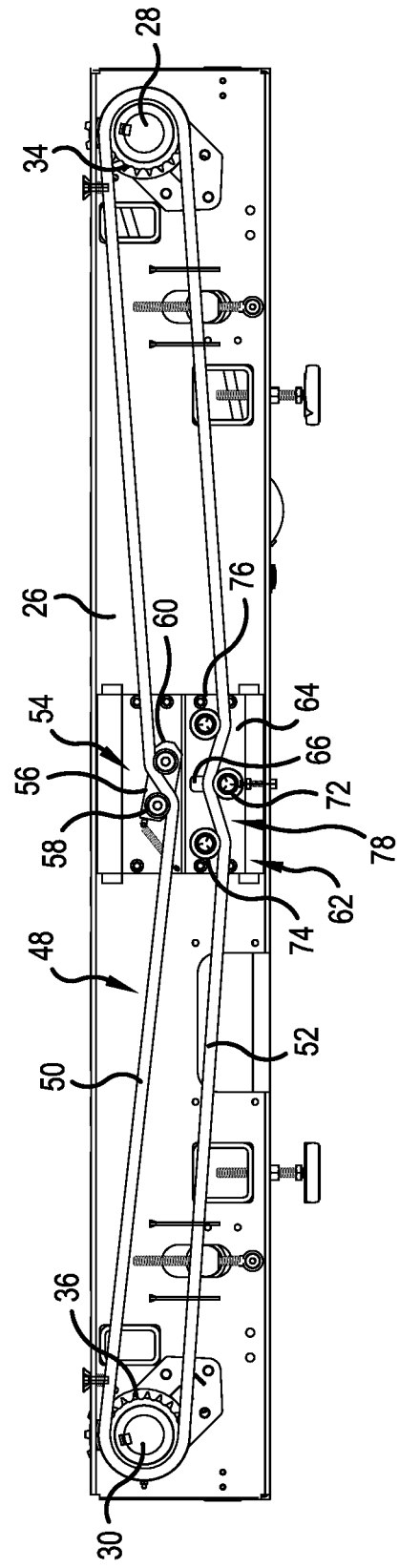
FIG. 4 is a right side elevational view of the conveyor of FIG. 1.

The right frame member 26 is shown in FIG. 4. A second drive chain 48 connects the first gear 34 on the front support shaft 28 to the second gear 36 on the rear support shaft 30. The second drive chain 48 includes an upper run 50 and a lower run 52. A first tensioning device 54 is connected to the upper run 50 to maintain a predetermined tension on the upper run 50 of the second drive chain 48. This tensioning device 54 may comprise, for example, a support arm 56 that is supported for pivotable movement around its center and that is spring biased in a counterclockwise direction (as viewed in FIG. 4). A first tensioning wheel 58 and a second tensioning wheel 60 are mounted on opposite ends of the support arm 56 in engagement with the upper and lower sides, respectively, of the upper run 50. The counterclockwise biasing force produced by the support arm 56 presses the first tensioning wheel 58 downward and the second tensioning wheel 60 upward to remove slack from the upper run 50 of the second drive chain 48 and maintain a substantially constant tension on the upper run 50. The first and second tensioning wheels 58, 60 can be any elements, rotatably or not, suitable for engaging and guiding the second drive chain 48 such as, for example, toothed sprockets, flanged wheels, etc.

Figure 6:
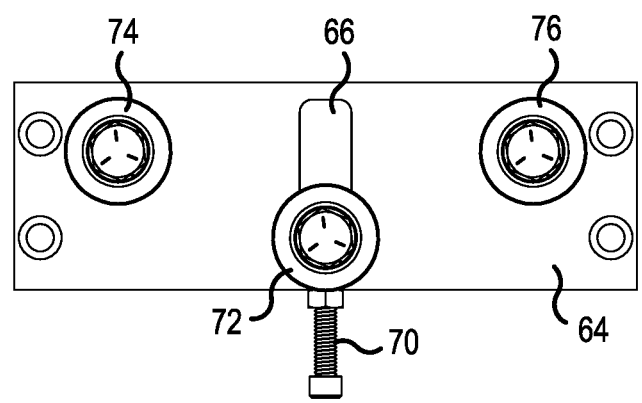
FIG. 6 is a front elevational view of a tension adjusting mechanism of the conveyor of FIG. 1.
Figure 7:
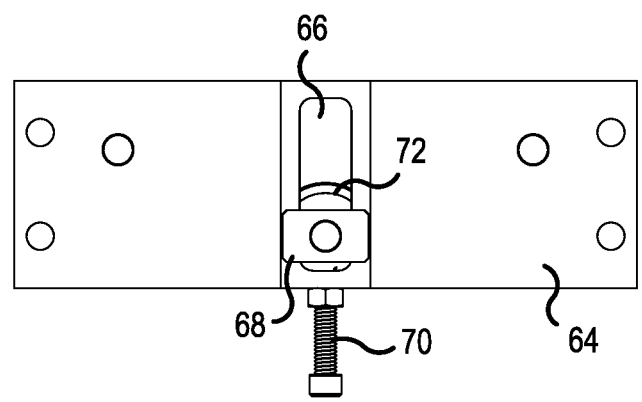
FIG. 7 is a rear elevational view of the tension adjusting mechanism of FIG. 6.

A chain displacement arrangement 62 is associated with the lower run 52 of the second drive chain 48 and is mounted on the right frame member 26. The chain displacement arrangement 62 is illustrated separately from the right frame member 26 in FIGS. 6 and 7. The chain displacement arrangement 62 includes a plate 64 mounted to the right frame member 26. Alternately, the elements of the chain displacement arrangement 62 discussed below could be supported directly by the right frame member 26.

The chain displacement arrangement 62 includes a slot 66 and a block 68 mounted for sliding vertical movement in the slot 66. A jackscrew 70 extends through an opening in the plate 64 into the slot 66 and connects to the block 68. Screwing the jackscrew 70 into and out of the hole in the plate 64 move the block 68 up and down in the slot 64.

A first wheel 72 is mounted on the block 68 and a second wheel 74 and a third wheel 76 are mounted on the plate 64 on opposite sides of the slot 66. The second and third wheels 72, 74 are rotatable relative to the plate 64 but the axes of these wheels are fixed relative to the plate 64. A center portion 78 of the lower run 52 of the second drive chain 48 passes above and is supported by the first wheel 72 and beneath the second and third wheels 74, 76. Raising the first wheel 72 presses the center portion 78 against the second and third wheels 74, 76 and increases the length of the lower run 52.

The operation of the disclosed conveyor will now be described. With the flexible belts 20 mounted on the sprockets 32 of the front and rear support shafts 28, 30, the upper support surface 22 of the conveyor 10 can be moved in forward and reverse directions by operating the drive 40 in forward and reverse directions. When the drive 40 rotates the drive gear 44 counterclockwise in FIG. 3 it moves the first drive chain 46 and rotates the front support shaft 28 "forward" (which is counterclockwise in FIG. 3 and clockwise in FIG. 4). This rotation draws the upper support surface 22 of the flexible belt 20 toward the front support shaft 28. Because the inner surfaces of the flexible belts 20 engages the sprockets 32 on the front and rear support shafts 28, 30, the rotation of the front support shaft 28 both pulls the belts 20 toward the front support shaft 28 and causes the rear support shaft 30 to rotate. The rear support shaft 30 is thus not directly driven by the drive 40 and does not push against the upper support portion 22 of the flexible belts 20. During this forward operation, the second drive chain 48 is also driven by the rotation of the first gear 34, and rotates the second gear 36, but the second drive chain does not perform a driving function.

In order to drive the upper support surface 22 of the belt 20 toward the rear support shaft 30, the drive 40 is reversed to cause the first drive gear 44 to rotate clockwise as illustrated in FIG. 3. If not for the presence of the second drive chain 48, this movement would cause the front support shaft 28 to push against the upper portion of the flexible belt 20 which would not drive the flexible belts 22 efficiently or at all. However, the rotation of the front support shaft 28 rotates the first gear 34 on the right side of the conveyor 20, and the first gear 34 is connected to the second gear 36 on the rear support shaft 30 by the second drive chain 48. The movement of the lower run 52 of the drive chain 48 rotates the second gear 36 counterclockwise in FIG. 4 which pulls the upper support surface 22 of the flexible belts 22 toward the rear support shaft 30.

The tension on the upper support surface 22 of the flexible belts 20 is adjusted by rotating the jackscrew 70 to raise or lower the first wheel 72. Turning the jackscrew 70 to raise the block 68 and the first wheel 72 pushes the first wheel 72 upward against the center portion 78 of the lower run 52 of the second drive chain 48. There is no slack in the lower run 52, and this upward pressure on the center portion 78 pulls the front and rear portions of the lower run 52 toward the first wheel 72. This movement thus rotates the front support shaft 28 clockwise as viewed in FIG. 4 and the rear support shaft 30 counterclockwise. The tensioning device 54 in the upper run of the second drive chain 48 allows the upper run 50 to lengthen while maintaining a substantially constant tension. However, this counter rotation of the front and rear support shafts 28, 30 increases the tension on the flexible belts 20 connected to the support shafts 28, 30. Thus the tension in the upper support portion 22 of the flexible belts 20 can be controlled indirectly by changing the length of the lower run 52 of the second drive chain 48. Of course, the tension in the upper support portion 22 of the flexible belts 20 can be decreased by rotating the jackscrew 70 to lower the first wheel.

Other mechanisms for displacing the lower run 52 of the second drive chain 48 can be envisioned such as the use of a linear actuator or pneumatic piston or a pinon with a gear rack to control the motion of the first wheel without exceeding the scope of the disclosure.

Figure 8:
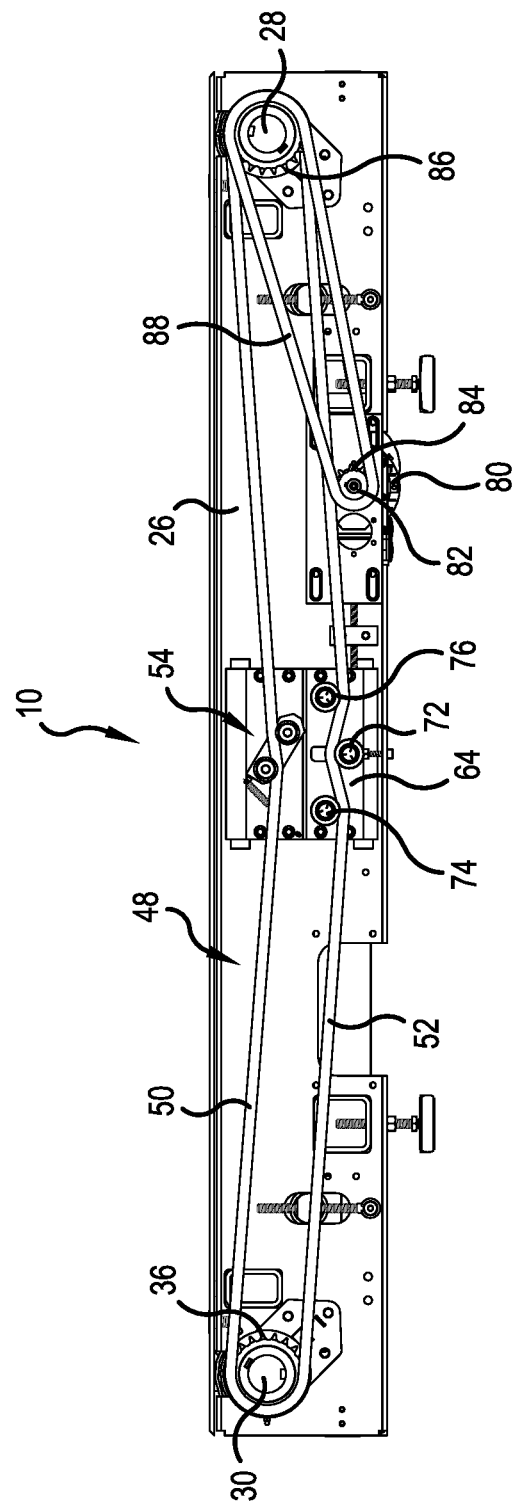
FIG. 8 is a right side elevational view of a conveyor according to a second embodiment of the present disclosure that includes the belt tension adjustment mechanism of FIG. 1.
Figure 9:
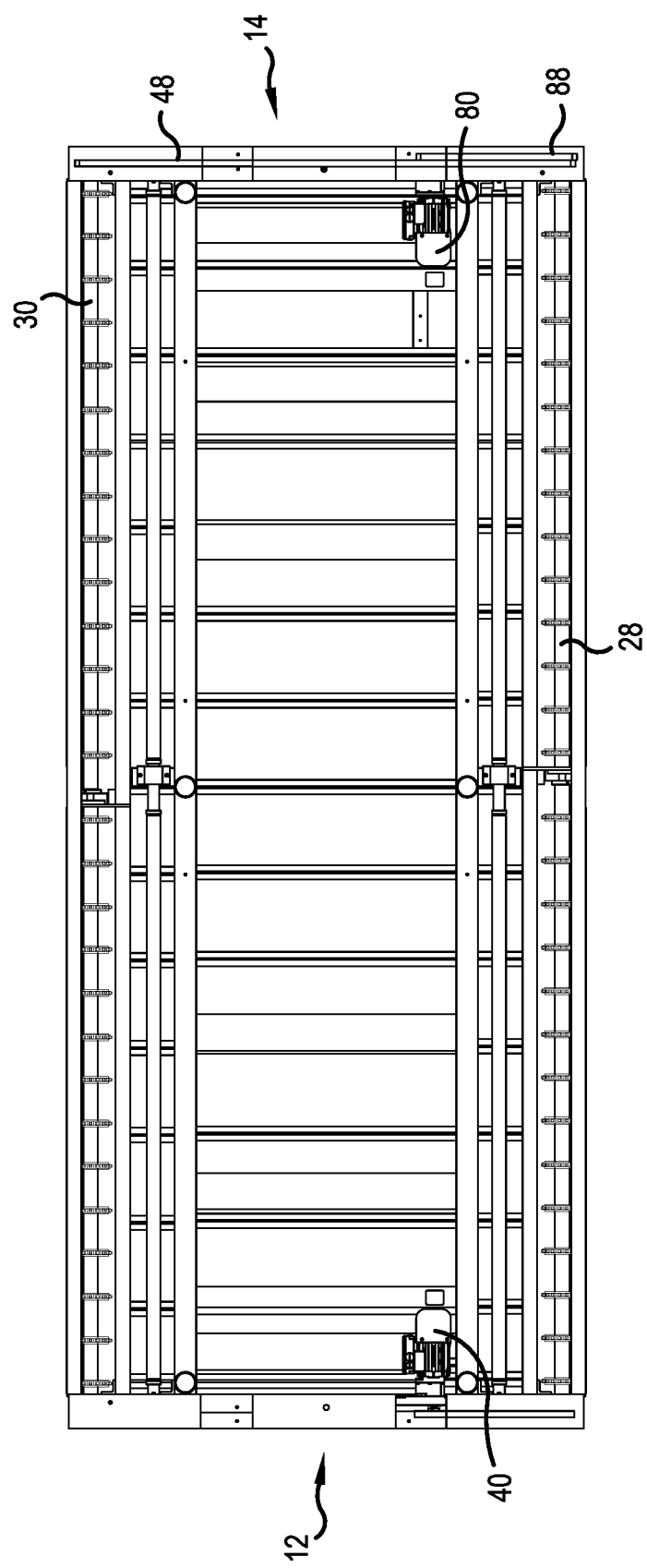
FIG. 9 is a bottom plan view the conveyor of FIG. 8.

A second embodiment of the invention is illustrated in FIGS. 8 and 9. Elements common to the first embodiment are identified with like reference numerals and only differences between the two embodiments are discussed below.

The second embodiment differs from the first embodiment primarily in the use of a second drive 80 at the right frame member 26 which second drive 80 can be used instead of or, as illustrated, in addition to the first drive 40 discussed above.

The second drive 80 is supported by the right frame member 26 and includes a drive shaft 82 that extends through the right frame member 26 and a drive gear 84 at the end of the drive shaft 82. A fourth gear 86 is mounted to the front support shaft 28 outward of the first gear 34 (which is hidden from view by the fourth gear 86 in FIG. 8), that is, such that the first gear 34 is located between the fourth gear 86 and the right frame member 26. A third drive chain 88 connects the drive gear 84 to the fourth gear 86.

The second drive 80 is configured to turn the fourth gear 86, and the front support shaft 28 connected thereto, in a first direction, which pulls the upper support surface 22 of the flexible belts 20 toward the front support shaft 28 or to turn the fourth gear 86 in an opposite direction to cause the front support shaft 28 to drive the second gear 36, via the lower run 52 of the second drive chain 48, in a direction to pull the upper support surface 22 of the conveyor 10 toward the rear support shaft 30 as discussed above in connection with the first embodiment.

The second drive 80 is used in conjunction with the first drive 40 to rotate the front support shaft 28. That is, the second drive 80 provides additional motive force for moving the flexible belts 20 in forward and rearward directions when the first drive 40 cannot provide adequate force and/or when it is preferred to use two smaller drives 40, 80 rather than a single larger version of the drive 40 to provide the force needed to operate the conveyor 10. Of course, it is also possible to omit the first drive 40 at the left side of the conveyor 10 and to power the conveyor using only the second drive 80 when only a single drive is required.

The present invention has been described herein in terms of presently preferred embodiments. However, modifications and additions to these embodiments will become apparent to persons of ordinary skill in the relevant art upon a reading of the foregoing description. It is intended that all such modifications and additions comprise a part of the present disclosure to the extent they fall within the scope of the several claims appended hereto.

What is claimed is:

1. A method of tensioning at least one belt of a conveyor, the conveyor comprising:
   a first support shaft,
   a second support shaft,
   a first gear connected to the first support shaft,
   a second gear connected to the second support shaft, and
   a drive chain or drive belt supported by the first and second gears, the drive chain or drive belt having an upper run and a lower run, the drive chain or drive belt being configured to rotate the first support shaft to drive the at least one belt,
   wherein the at least one belt is supported between the first and second support shafts and has an upper load-carrying portion and a lower return portion,
   the method comprising:
   displacing a portion of the lower run to rotate the first gear in a first direction and the second gear in a second direction opposite the first direction to increase a tension of the upper load-carrying portion of the at least one belt.

2. The method according to claim 1,
   wherein the conveyor further comprises tensioning means for controlling a tension of the upper run.

3. The method according to claim 2,
   wherein the conveyor further comprises a first wheel in contact with a first side of the lower run, and
   wherein displacing a portion of the lower run comprises pressing the first wheel against the lower run to increase a length of the lower run.

4. The method according to claim 3,
   wherein the first wheel comprises a gear.

5. The method according to claim 1,
   wherein the conveyor further comprises a first wheel in contact with a first side of the lower run, a second wheel in contact with the second side of the lower run and a third wheel in contact with the second side of the lower run,
   wherein the first wheel is located between the second wheel and the third wheel,
   wherein the second wheel is located between the first gear and the first wheel and the third wheel is located between the second gear and the first wheel, and
   wherein displacing a portion of the lower run comprises pressing the first wheel against the lower run to press the lower run against the second wheel and the third wheel to increase a length of the lower run.

6. The method according to claim 5,
   wherein the first wheel comprises a third gear, the second wheel comprises a fourth gear and the third wheel comprise a fifth gear.

7. The method according to claim 1,
wherein the conveyor further comprises a frame having a first side member and a second side member,
wherein the first support shaft has a first end supported by the first side member and a second end supported by the second side member and a first plurality of belt support wheels between the first side member and the second side member,
wherein the second support shaft has a first end supported by the first side member and a second end supported by the second side member and a second plurality of belt support wheels between the first side member and the second side member,
wherein the first gear is located at the first end of the first support shaft and the second gear is located at the first end of the second support shaft,
wherein the first support shaft includes at least one third gear at the first end and/or at the second end of the first support shaft,
wherein at least one drive is operably connected to the at least one third gear,
the method further comprising:
driving the load-carrying portion of the at least one conveyor belt in a forward direction by using the at least one drive to rotate the at least one third gear, and
driving the load-carrying portion of the at least one conveyor belt in a reverse direction by using the at least one drive to rotate the at least one third gear.

8. The method according to claim 7,
wherein the return portion runs between the drive and the upper support portion.

9. The method according to claim 1,
wherein the drive chain or drive belt comprises the chain.

10. A conveyor comprising:
a first support shaft,
a second support shaft,
at least one belt supported between the first and second support shafts and having an upper load-carrying portion and a lower return portion,
a first gear connected to the first support shaft,
a second gear connected to the second support shaft,
a drive chain or drive belt supported by the first and second gears, the drive chain or drive belt having an upper run and a lower run, the drive chain or drive belt being configured to rotate the first support shaft to drive the at least one belt,
means for controlling a tension of the upper run by varying a length of the upper run, and
means for displacing a portion of the lower run to rotate the first gear in a first direction and the second gear in a second direction opposite the first direction to increase a tension of the upper load carrying portion of the at least one belt.

11. The conveyor according to claim 10,
wherein the means for displacing a portion of the lower run comprises a first wheel in contact with a first side of the lower run, a second wheel in contact with the second side of the lower run and a third wheel in contact with the second side of the lower run, the first wheel being located between the second wheel and the third wheel.

12. The conveyor according to claim 10, further comprising:
a frame having a first side member and a second side member, and
at least one drive,
wherein the first support shaft has a first end supported by the first side member and a second end supported by the second side member and a first plurality of belt-support wheels between the first side member and the second side member,
wherein the second support shaft has a first end supported by the first side member and a second end supported by the second side member and a second plurality of belt-support wheels between the first side member and the second side member,
wherein the first gear is located at the first end of the first support shaft and the second gear is located at the first end of the second support shaft,
wherein the first support shaft includes at least one third gear at the first end and/or second end of the first support shaft, and
wherein the at least one drive is operably connected to the at least one third gear.

13. The conveyor according to claim 12,
wherein the at least one third gear comprises a first third gear at the first end of the first support shaft and a second third gear at the second end of the first support shaft, and
wherein the at least one drive comprises a first drive configured to drive the first third gear and a second drive configured to drive the second third gear.

14. The conveyor according to claim 10,
wherein the means for displacing a portion of the lower run comprises a first wheel in contact with a first side of the lower run, a second wheel in contact with the second side of the lower run and a third wheel in contact with the second side of the lower run, the first wheel being located between the second wheel and the third wheel.

15. The conveyor according to claim 14,
wherein the first support includes a guide slot,
wherein a slide member is slidably mounted in the guide slot,
wherein the first and second wheels are mounted on opposite sides of the guide slot,
wherein the first wheel is mounted on the slide, and
wherein the frame includes means for moving the slide in the slot and biasing the first wheel against the drive chain or drive belt.

16. The conveyor according to claim 15,
wherein the means for moving comprises a threaded member rotatably mounted in an opening adjacent the guide slot and having an end in contact with the slide such that rotating the threaded member moves the slide along the guide slot.

17. The conveyor according to claim 10,
wherein the drive chain or drive belt comprises the drive chain.

* * * * *